UNITED STATES PATENT OFFICE.

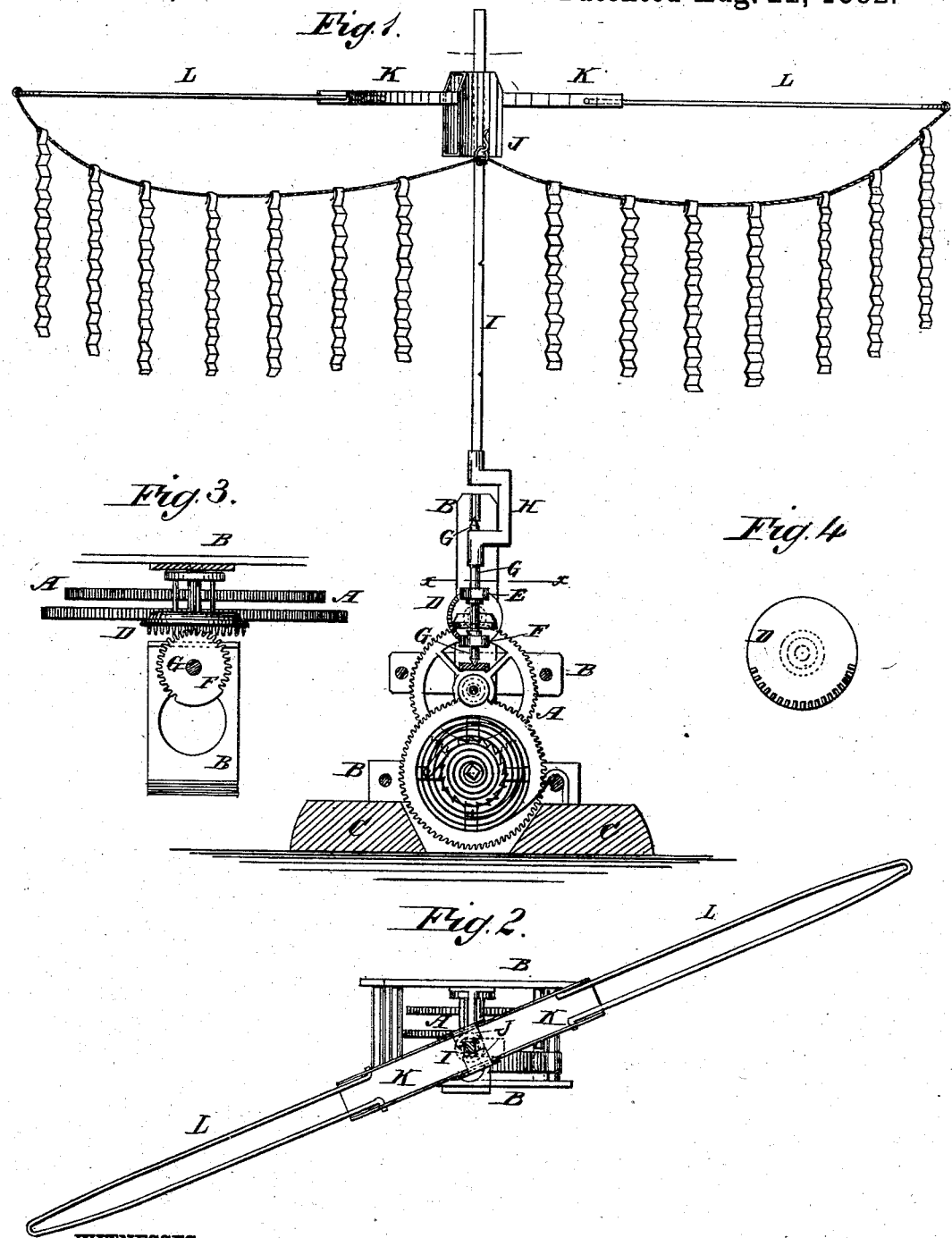

CHARLES T. MASON, OF SUMTER, SOUTH CAROLINA.

ESCAPEMENT FOR FLY-FANS, &c.

SPECIFICATION forming part of Letters Patent No. 263,190, dated August 22, 1882.

Application filed May 20, 1882. (Model.)

*To all whom it may concern:*

Be it known that I, CHARLES T. MASON, of Sumter, in the county of Sumter and State of South Carolina, have invented a new and useful Improvement in Escapements for Fly-Fans and other Mechanisms, of which the following is a full, clear, and exact description.

Reference is to be had to the accompanying drawings, forming a part of this specification, in which similar letters of reference indicate corresponding parts in all the figures.

Figure 1 is a front elevation of my improvement, partly in section. Fig. 2 is a plan view of the same. Fig. 3 is a sectional plan view of the same, taken through the line $x$ $x$, Fig. 1. Fig. 4 is a front elevation of the escapement-wheel.

The object of this invention is to provide a simple and reliable escapement for fly-fans and other mechanisms that require a reciprocating rotary movement; and it consists in the peculiar arrangement of parts, as hereinafter fully shown and set forth.

A represents a clock-work, the frame B of which is secured to a bar, C, or other suitable support. To the post of the last wheel of the train is attached the escapement-wheel D, which is made in the form of a bevel-gear wheel, with a part of its teeth cut away, as shown in Fig. 4. The teeth of the wheel D mesh successively into the teeth of two beveled-gear wheels, E F, attached to a shaft, G, in such positions that the said gear-wheels E F will engage with the opposite sides of the wheel D. The ends of the shaft G revolve in pivot-bearings in arms or bars attached to the frame B. To the upper part of the shaft G is attached one end of a crank bar or shaft, H, which passes around the arm to which the end of the shaft G is pivoted, and to its other end is attached the end of the shaft I. The shaft I is made square, passes through a square hole in the clamp J, that carries the bar K, and is notched to receive the jaws of the clamp J, so that the bar K can be readily adjusted at any desired height. To the ends of the bar K are hinged the ends of the arms L, so that the said arms can be folded up when desired. The arms L carry fans, pendants, or other articles, as may be desired.

With this construction, as the clock-work is driven by its spring the teeth of the escapement-wheel D mesh successively into the teeth of the gear-wheels E F and give to the shaft G and its attachments a reciprocating rotary movement.

The escapement-wheel D has been shown and described as being made with a single blank space; but it may be made with any desired number of blank spaces, provided the blank and toothed spaces are so arranged that a blank space may be opposite one of the wheels E F when a toothed space is in gear with the other of the said wheels, and that the said toothed spaces will engage successively with the said wheels E F.

I am aware that a gear-wheel provided with one or more segments of teeth to engage corresponding teeth in a pinion to produce vibratory motion in fans and other mechanism is not new, and I do not claim this, broadly; but

What I claim, and wish to secure by Letters Patent, is—

In combination with the clock-work A and segment-wheel D, running continually in one direction, the shaft G, extension I, and crank H, provided with the gear-wheels E F, caused to vibrate by the segment-wheel D and the frame B, in bearings of which the shaft G is pivoted, as shown and described.

CHARLES T. MASON.

Witnesses:
J. E. SUARES,
C. I. MASON, Jr.